United States Patent [19]

Zeng et al.

[11] Patent Number: 6,089,094
[45] Date of Patent: Jul. 18, 2000

[54] ACOUSTICAL METHOD AND SYSTEM FOR MEASURING BARRIER MEMBRANE THICKNESS AND THE CORRESPONDENT AREA DISTRIBUTION USING MAXIMUM TRANSMISSION OR MAXIMUM REFLECTION COEFFICIENTS

[75] Inventors: Shengke Zeng; Stephen P. Berardinelli, both of Morgantown, W. Va.

[73] Assignee: The United States of America as represented by the Department of Health and Human Services, Washington, D.C.

[21] Appl. No.: 09/147,936

[22] PCT Filed: Oct. 9, 1997

[86] PCT No.: PCT/US97/18221

§ 371 Date: May 5, 1999

§ 102(e) Date: May 5, 1999

[87] PCT Pub. No.: WO98/16800

PCT Pub. Date: Apr. 23, 1998

[51] Int. Cl.[7] .................................................. G01N 29/18
[52] U.S. Cl. ............................................. 73/579; 73/159
[58] Field of Search .............................. 73/159, 579, 596, 73/597, 598, 599, 600, 627, 645, 646, 647, 648, 570

[56] References Cited

U.S. PATENT DOCUMENTS

| | | | |
|---|---|---|---|
| 3,844,166 | 10/1974 | Carossi et al. | 73/622 |
| 4,539,847 | 9/1985 | Paap | 73/579 |
| 5,222,329 | 6/1993 | Yu | 51/165.77 |
| 5,271,274 | 12/1993 | Khuri-Yakub et al. | 73/597 |
| 5,672,828 | 9/1997 | Allan | 73/579 |

OTHER PUBLICATIONS

Kinsler, LE, Frey Art, Coppens AB, Sanders JV [1982]. Fundamentals of acoustics. $3^{rd}$ ed., New York, NY; W.J., pp. 126–131.

American Society for Testing and Materials [1990]. Standard specification for rubber surgical gloves. In: ASTM Standards on protective clothing. Philadelphia, PA, American Society for Testing and Materials, pp. 133–135.

American Society for Testing Materials [1990]. Standard specification for rubber examination gloves. In: ASTM standards on protective clothing. Philadelphia, PA, American Society for Testing and Materials, pp. 136–138.

Method 2011: Thickness micrometer, flat foot [1955]. Fed. Test method std., No. 601.

Method 2031: Thickness, optical [1955]. Fed. Test method std. No.

*Primary Examiner*—Richard A. Moller
*Attorney, Agent, or Firm*—Fitch, Even, Tabin & Flannery

[57] ABSTRACT

The invention relates a method and a system for membrane thickness and the correspondent area distribution measurement based on the dependency of the acoustic intensity transmission coefficient upon the thickness of the insertion membrane and the proportion of the power of the transmitted acoustic plane waves to the area of the insertion membrane. The principle of the invention is that, when the acoustic wave travels in the acoustic medium and encounters an insertion membrane with different acoustic impedance, the intensity transmission coefficient T is related to the thickness d of the insertion membrane and the frequency f of the transmitting acoustic wave. As f sweeps, maximum T occurs at a set of frequency points corresponding to a certain thickness of the insertion membrane. By confining the sweeping frequency within a certain range, $T_{max}$ can only occur at one frequency point corresponding to a certain thickness of the insertion membrane. This frequency can be converted into the correspondent membrane thickness.

6 Claims, 7 Drawing Sheets

ACOUSTICAL METHOD AND SYSTEM FOR MEASURING BARRIER MEMBRANE THICKNESS AND THE CORRESPONDENT AREA DISTRIBUTION USING MAXIMUM TRANSMISSION OR MAXIMUM REFLECTION COEFFICIENTS

FIELD OF THE INVENTION

This invention measures the thickness distribution of the protective barrier membrane used in personal protective equipment such a surgical latex or other gloves, protective clothing or condoms, in order to provide information on the thickness and the correspondent relative area of the protective barrier membrane.

BACKGROUND ART

Thickness is one of the quality control data of the protective barrier membrane which is required by the U.S. Government and American Society for Testing and Materials (ASTM). The minimum thickness requirement is 0.1 mm for rubber surgical gloves [2], and 0.08 mm for rubber examination gloves [3].

The thickness of rubber barrier can be tested using the following methods:

Micrometer method. A dial micrometer with an anvil and a pressure foot is used to exert a certain force on the membrane, which is placed between the anvil and the pressure foot. The dial is graduated to read the thickness of the membrane [4], [5].

Optical method. A microscope equipped with a mechanical stage, and a ruled glass disk or ocular micrometer is used to directly read the scale of the thickness of a barrier membrane, which stands edgewise on the stage [6].

Acoustic echo method. An acoustic system measures the thickness of a barrier by propagating an acoustic wave through the barrier membrane such that echo waves are generated and received by a transducer. The thickness value is obtained from the time lapse between the propagated wave and receipt of the echo wave [7].

Two U.S. patents deal with the acoustic echo method using a sweeping acoustic frequency and the echo waves from the interfaces either to measure the thickness of a coating layer on a substrate, or to control the depth of removal of a selected material on a polishing pad [8], [9]. The transmission pattern of the acoustic waves is provides a basis for determining the thickness of the coating or the depth of the removal.

Glossary of Symbols

A Area of the insertion membrane with certain thickness.
d Thickness of the insertion membrane.
f Frequency of the pressure wave.
I Intensity of the transmitted pressure wave at the ultrasonic receiver.
M Insertion membrane.
R Intensity reflection coefficient.
T Intensity transmission coefficient, R+T=1 for normal incidence acoustical wave.
$T_{max}$ Maximum T.
$T_{min}$ Minimum T.
U Pressure wave.
W Power of the transmitted pressure wave at the ultrasonic receiver.

DISCLOSURE OF THE INVENTION

The present invention relates a method and a system for membrane thickness and the correspondent area distribution measurement based on the dependence of the acoustic intensity transmission coefficient upon the thickness of the insertion membrane and the proportion of the power of the transmitted acoustic plane waves to the area of the insertion membrane. The principle of this invention is that when the acoustic wave travels in the acoustic medium and encounter an insertion membrane with different acoustic impedance, the intensity transmission coefficient T is related to the thickness of the insertion membrane d, and the frequency of the transmitting acoustic wave f. As f sweeps, maximum T ($T_{max}$=1) occurs at a set of frequency points corresponding to a certain thickness of the insertion membrane. By confining the sweeping frequency within a certain range, $T_{max}$ can only occur at one frequency point corresponding to a certain thickness of the insertion membrane. This frequency can be converted into the correspondent membrane thickness. The power of the maximum transmission of a plane wave is proportional to the area of the correspondent thickness of the membrane. The transmitted power of the acoustic wave at the frequency of $T_{max}$ can be converted into the area of the insertion membrane with the correspondent thickness. If the insertion membrane has different thicknesses, $T_{max}$ occurs at different frequency points with different maximum transmission power values corresponding to different thicknesses of the insertion membrane with different correspondent areas. The derived method to measure the thickness of the barrier membrane is to observe maximum power of a plane acoustic wave reflected from the insertion barrier membrane. This derived method is actually equivalent to the former method, since the intensity reflection coefficient R is equal to 1−T for normal incidence acoustic wave.

BEST MODE FOR CARRYING OUT THE INVENTION

Figure 1:
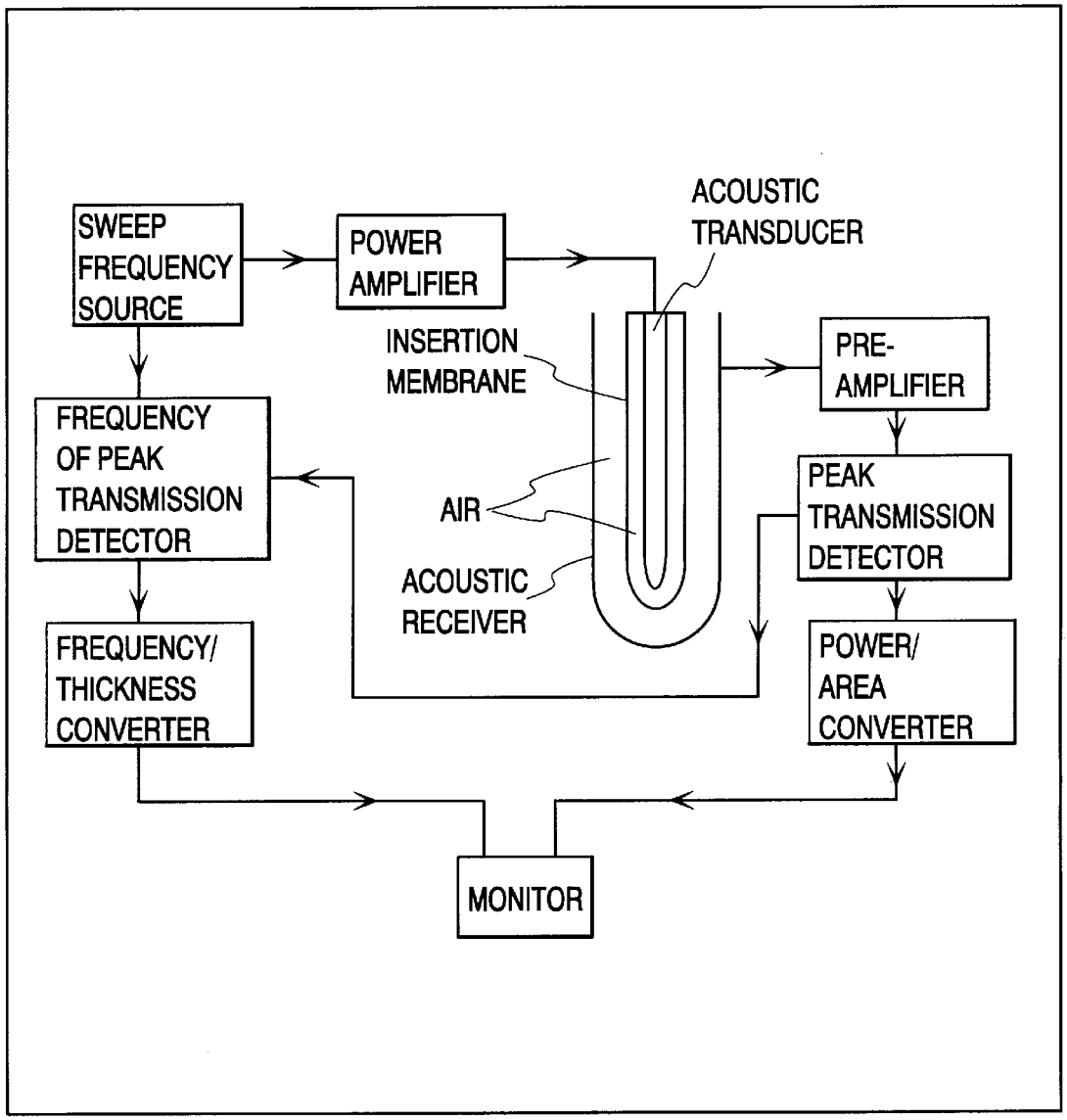
FIG. 1 shows the system for measuring the thickness distribution of barrier membranes using the maximum transmission coefficient method. The system is consists of a sweep-frequency source, a power amplifier, an acoustic transducer, an acoustic receiver, a pre-amplifier, a peak transmission detector, a frequency-of-peak-transmission detector, a frequency/thickness converter, a power/are converter, and a monitor. The sweep-frequency source provides sweeping ultrasonic frequencies to the power amplifier and the frequency-of-peak-transmission detector within certain frequency range. The sweeping ultrasonic signals are power-amplified by the power amplifier and sent to the acoustic transducer to be converted into sweeping ultrasonic pressure wave U. f, the frequency of U, is confined within certain range to avoid multi-$T_{max}$'s corresponding to one membrane thickness. The pressure wave U travels through the air and encounters the insertion membrane M. The U is reflected and transmitted at the interfaces of the air-membrane-air sandwich. T, the intensity transmission coefficient of U, is related to the acoustic impedances of the air and the membrane, the thickness of the membrane d, and the acoustic frequency f. The pressure wave U finally arrives at the acoustic receiver and is converted into the electrical signal by the receiver. The power of the acoustic plane wave W is proportional to the transmission coefficient T and proportional to the area of the membrane with the correspondent thickness. The converted W is amplified by the pre-amplifier, and sent to the peak transmission detector. When the peak transmission detector detects the peak of W, it immediately sends a synchronous signal to the frequency-of-peak-transmission detector to activate the frequency-of-peak-transmission detector to record the frequency at $T_{max}$. This frequency f at $T_{max}$ is converted into the correspondent thickness by the frequency/thickness converter. The peak transmission detector also sends the detected peak power to the power/area converter. The detected peak power is converted into the area A, which corresponds to the detected thickness, by the power/area converter. The converted thickness d and A are sent to the monitor. The monitor shows the thickness distribution with the abscissa presenting d, the thickness range of the membrane, and the ordinate presenting A, the area of the membrane corresponding to the thickness.
Figure 2:
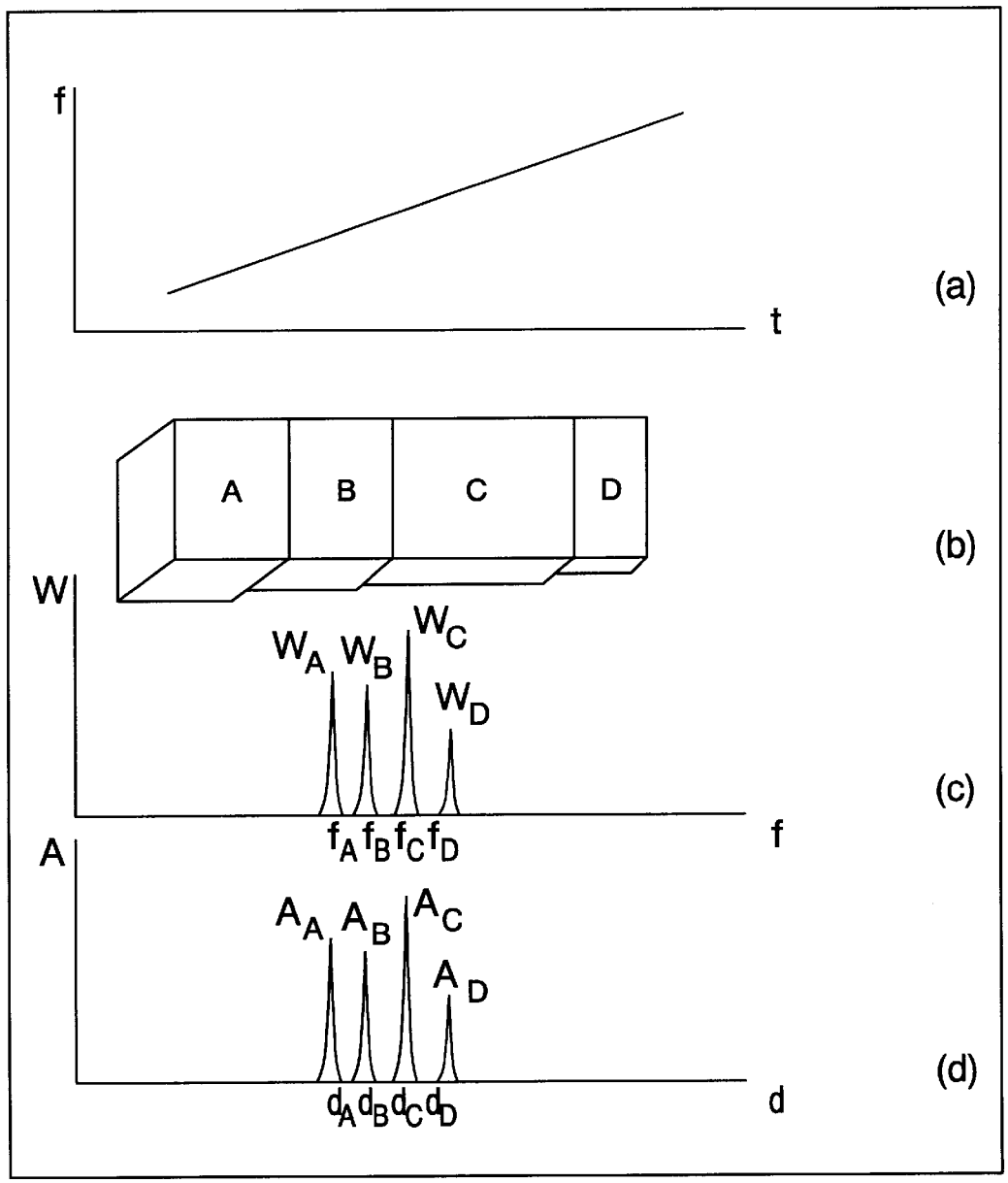
FIG. 2 shows the principles of the thickness distribution measurement. (a) shows f, the sweeping frequency of the acoustic pressure wave U. (b) shows four insertion membranes with different thickness d and different area A. $d_A<d_B<d_C<d_D$ and $A_D<A_B<A_A<A_C$. (c) shows the power of W of the transmitted plane pressure wave U. The frequency where $T_{max}$ occurs is inversely proportional to the thickness of the membrane. Since the thicknesses $d_A<d_B<d_C<d_D$, the frequencies of $T_{max}$, $f_A>f_B>f_C>f_D$. The power of the plane pressure wave, W, transmitted through the membrane with certain thickness, is proportional to the area of that membrane. Since the areas of the membranes $A_D<A_B<A_A<A_C$, the power of the transmitted pressure wave $W_D<W_B<W_A<W_C$. (d) shows the Area-Thickness plotting from the monitor. The W, power of the transmitted plane pressure wave, is converted into A, the area of the membrane with certain thickness. The f, frequency of $T_{max}$ with the correspondent thickness, is converted into d, the thickness of the insertion membrane.
Figure 3:
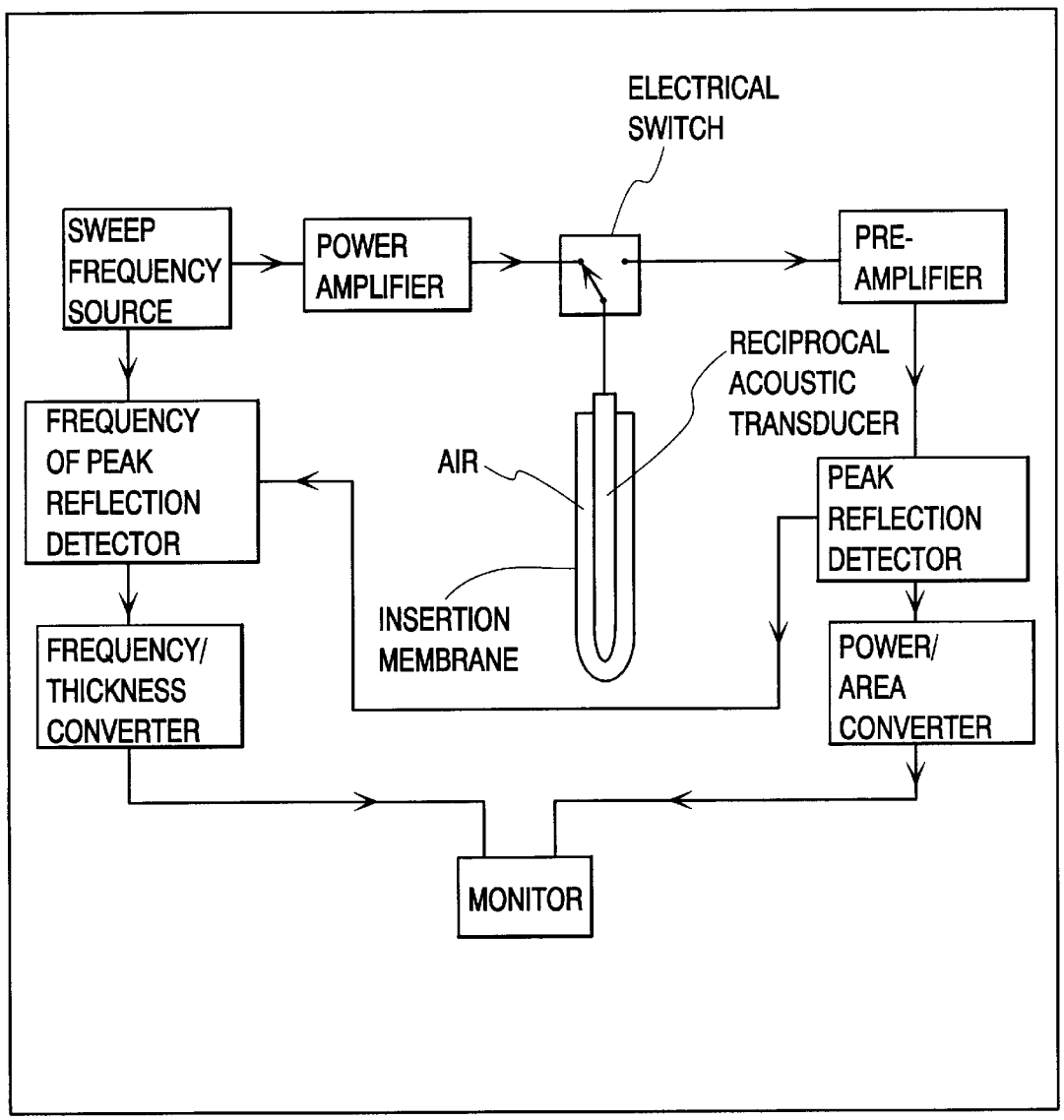
FIG. 3 is the block diagram which describes the system using maximum reflection coefficient method. This block diagram is actually the same as that in FIG. 1, which describes the system using maximum transmission coefficient method, except the following changes: (1) the peak reflection detector replaces the peak transmission detector; (2) the frequency-of-peak-reflection detector replaces the frequency-of-peak-transmission-detector; (3) the acoustic receiver is eliminated; (4) the reciprocal acoustic transducer replaces the acoustic transducer. The reciprocal acoustic transducer here has dual functions: transmitting and receiving acoustic waves. An electronically controlled switch determines the function of the acoustic transducer. When the switch points to the left, the transducer transmits the ultrasonic pressure wave to the insertion membrane. When the switch points to the right, the ultrasonic transducer receives the reflected pressure wave from the insertion membrane.
Figure 4:
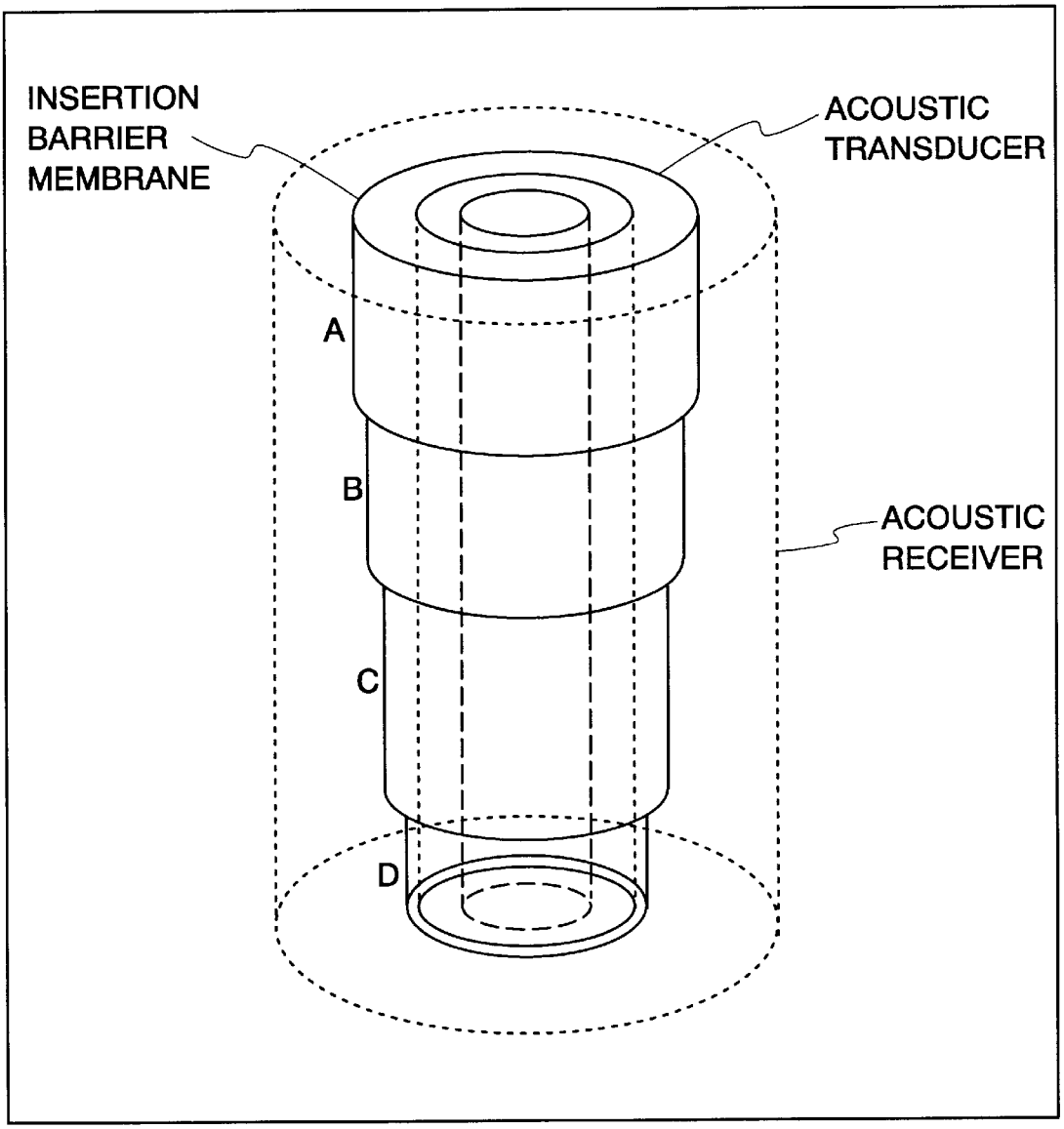
FIG. 4 shows the configuration of the transducer-insertion membrane-receiver sandwich. A cylindrical acoustic receiver surrounds the rod-like acoustic transducer. The transducer transmits a plane acoustic wave toward the receiver. A latex cylindrical membrane with four different thickness distributions is inserted between the transducer and receiver. The thicknesses $d_A>d_B>d_C>d_D$ and the areas $A_D<A_B<A_A<A_C$ with $d_A$=34 µm, $d_B$=32 µm, $d_C$=30.5 µm, $d_D$=30 µm; and $A_A$=7 area units, $A_B$=6 area units, $A_C$=8 area units, $A_d$=4 area units.
Figure 5:
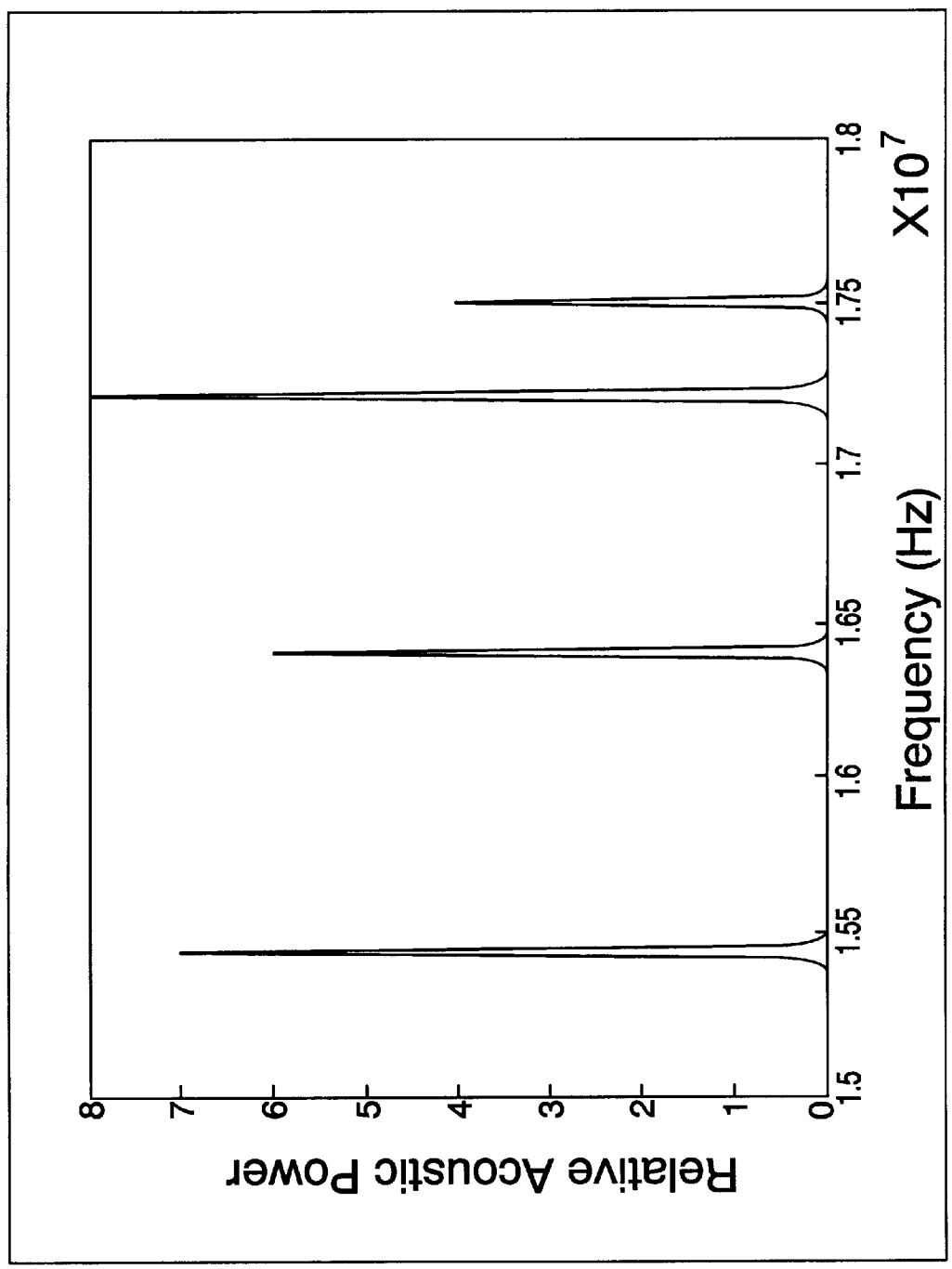
FIG. 5 shows the power output of the acoustic receiver, as the acoustic pressure transmits from the acoustic transducer through the insertion membrane in FIG. 4. The power peaks occur at the frequencies of 15.44, 16.41, 17.21 and 17.50 MHz, with the relative powers of 4, 8, 6, and 7 power units, corresponding to the thicknesses of 34, 32, 30.5 and 30 µm.
Figure 6:
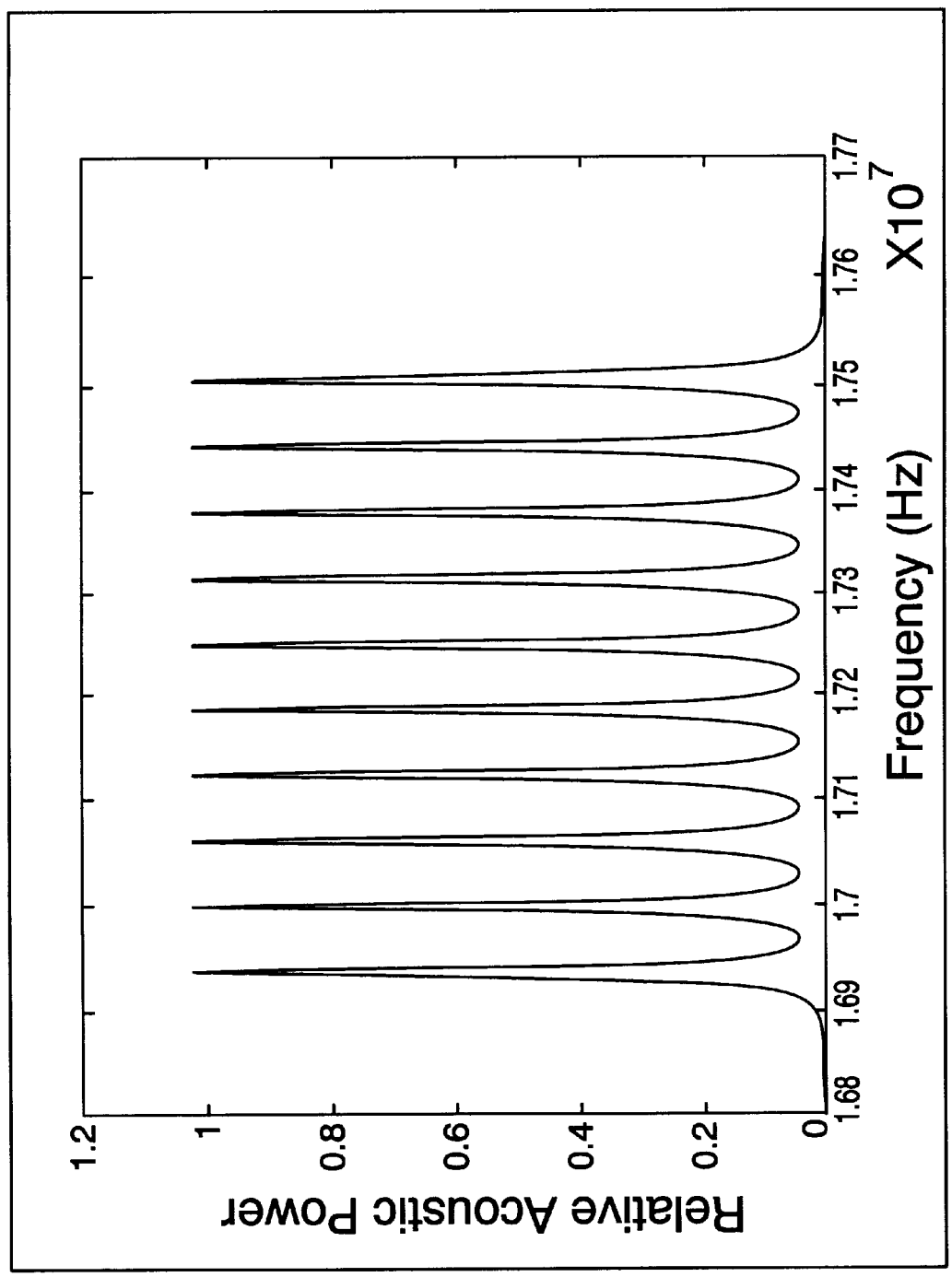
FIG. 6 shows the power output of the acoustic receiver in the configuration in FIG. 1. The insertion membrane has ten uniformly distributed thicknesses from 30 µm to 31 µm. The thickness step is 0.1 µm. The correspondent area is also uniformly distributed with the relative area unit of 1. Ten peak powers occur at acoustic frequencies uniformly distributed between 16.935 to 17.500 MHz with correspondent peak powers at 1 power unit.
Figure 7:
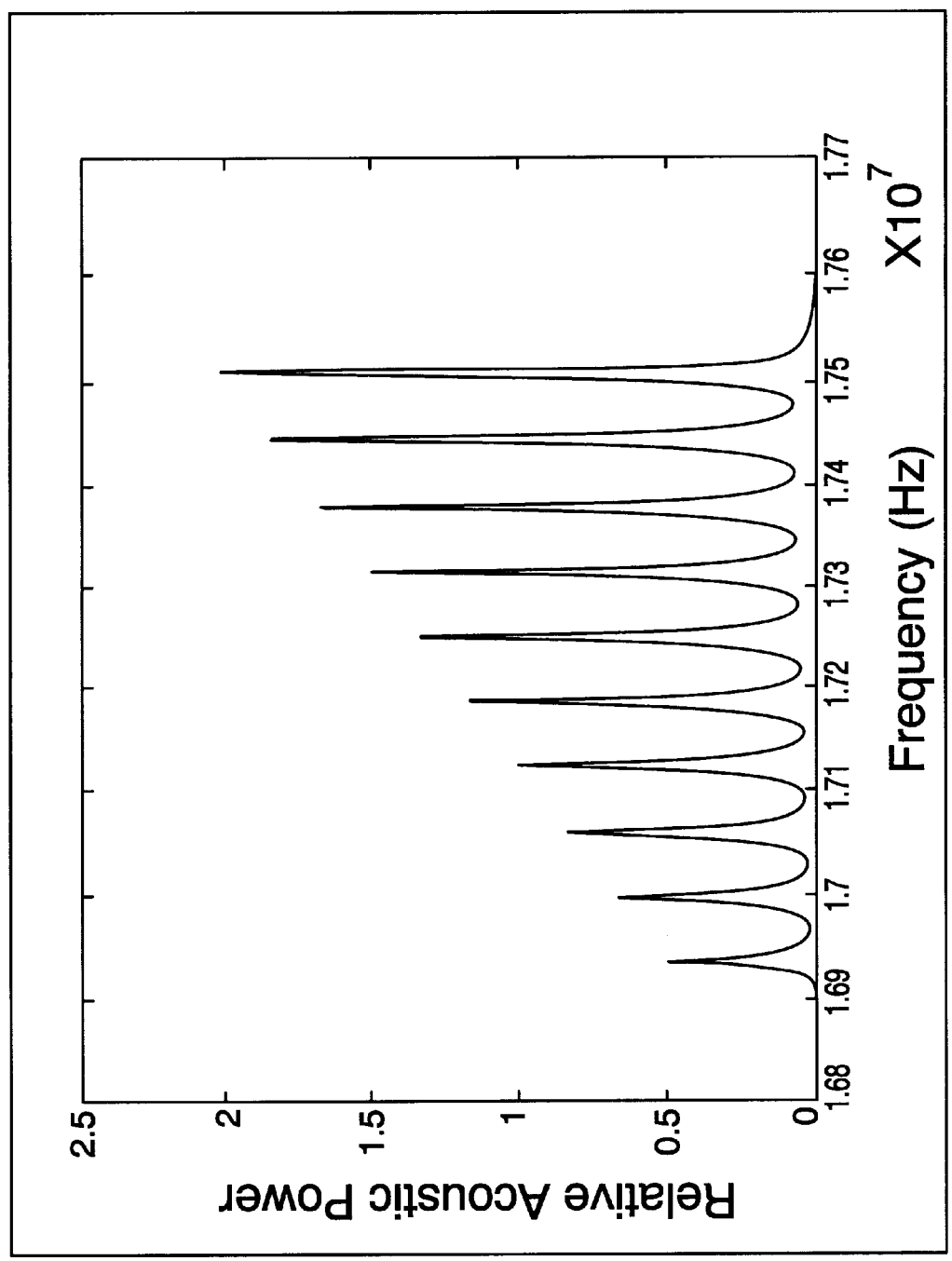
FIG. 7 shows the power output of the acoustic receiver in the configuration in FIG. 1. The insertion membrane is the same as that in FIG. 6, except that the area corresponding to each thickness is linearly distributed, i.e., linearly decreases from 2 area units at 30 µm, to 0.5 area units at 31 µm. Ten peak powers occur at acoustic frequencies uniformly distributed between 16.935 to 17.500 MHz with correspondent peak powers which are linearly distributed from 0.5 to 2 power units.

An ultrasonic transducer and an ultrasonic receiver, which have proper acoustic coatings on their surfaces to match the acoustic impedance of the air, are placed face to face at a certain distance in the air. Said ultrasonic transducer converts the electrical-sweeping-frequency signal into pressure wave U with the sweeping frequency f and transmits U in the air toward said ultrasonic receiver. Said ultrasonic receiver converts U back into the electrical signal. As a barrier membrane M is inserted between said transducer and said receiver, the traveling U encounters M, and is reflected and attenuated by M. The attenuated U transmits toward said receiver. The intensity transmission coefficient T is expressed in Eq. 1, $$T = \frac{1}{1 + \frac{1}{4}\left(\frac{r_2}{r_1} - \frac{r_1}{r_2}\right)^2 \sin^2\left(\frac{2\pi fd}{C}\right)}, \quad (1)$$

where $r_1$ is the acoustic impedance of the air, $r_2$ the acoustic impedance of the insertion membrane, and C the phase speed in the insertion membrane [1]. T reaches its maximum ($T_{max}$=1) when sin($2\pi fd/C$) becomes zero. Sin ($2\pi fd/C$) reaches zero when $2\pi fd/C = n\pi$, where n=0, 1, 2, 3 . . . Given an insertion membrane with certain C and d, $T_{max}$ occurs when f=nC/(2d). Generally, the phase speed of the insertion membrane is known. When f sweeps until T reaches its first maximum, i.e., until the output power of the ultrasonic receiver reaches its first maximum, the thickness of the insertion membrane d can be calculated as $$d = \frac{C}{2f(T_{max})}. \quad (2)$$

To avoid that one $T_{max}$ has multi-correspondent frequencies, the sweeping frequency f should be confined within a certain range. The f can be chosen as $$f_{max} < \frac{C}{d_{max}}. \quad (3)$$

Since the frequency f=C/(2d), this $f_{max}$ is no higher than the f correspondent to $d_{max}/2$. This means that the minimum thickness this method can measure is no less than $d_{max}/2$. As the insertion membrane is latex glove, the phase speed in a latex is 1050 m/s, and the maximum thickness of a latex glove is about 100 µm. The maximum frequency $f_{max}$ here is chosen as 10.5 MHz.

The power of the transmitted acoustic plane wave W, at the ultrasonic receiver, is the product of the area of the insertion membrane A, and the transmitted acoustic intensity I. Thus, W received by the ultrasonic receiver at the frequency f of $T_{max}$, can be converted into the area of the insertion membrane A, with the correspondent thickness d, using Eq. 4, $$A = \frac{W}{I}. \quad (4)$$

According to Eq. 1, the larger the acoustic impedance ratio of the insertion membrane to the acoustic medium, the larger the ratio of $T_{max}$ to $T_{min}$. The ratio of $T_{max}/T_{min}$ is equivalent to the signal-to-noise ratio (SNR) in the measurement. In order to clearly identify the $T_{max}$ and $T_{min}$, the SNR should be kept high. The air is chosen as the acoustic medium in this invention to keep the impedance ratio $r_2/r_1$ to be large. The acoustic impedance of the latex insertion membrane $r_2$ is $1.0 \times 10^6$ Pa•s/m, and the acoustic impedance of the air $r_1$ is 415 Pa•s/m [1]. Thus the ratio of $r_2/r_1$ in this invention is $2.4 \times 10^3$, and the ratio of $T_{max}/T_{min}$ is $1.5 \times 10^6$. This ratio is high enough to distinguish $T_{max}$ from $T_{min}$, and to keep the thickness resolution thinner than 0.1 µm.

The above description for measuring thickness of the insertion membrane d, and the correspondent area A, constitutes the maximum transmission coefficient method.

The following maximum reflection coefficient method is derived from the above maximum transmission coefficient method. The derivation is based on the theory that the intensity reflection coefficient R is related to the intensity transmission coefficient T with R=1−T, when the incidence acoustic wave is normal [1]. The R in this invention can be expressed as $$R = 1 - \frac{1}{1 + \frac{1}{4}\left(\frac{r_2}{r_1} - \frac{r_1}{r_2}\right)^2 \sin^2\left(\frac{2\pi f d}{C}\right)}. \quad (5)$$

R reaches maximum as the sin function in Eq. 5 is equal to 1. When $2\pi f d/C = (2n-1)\pi/2$, where n−1, 2, 3 . . . , R becomes $R_{max}$. In the measurement, the acoustic Frequency f up-sweeps until the first peak reflection is observed. At this f, the correspondent thickness d is $$d = \frac{C}{4f(R_{max})}. \quad (6)$$

In order to avoid that one $R_{max}$ has multi-correspondent frequencies, the maximum sweeping frequency f is confined as $$f_{max} < \frac{3C}{4d_{max}}. \quad (7)$$

As described in the maximum transmission coefficient method, the minimum thickness, which the maximum reflection coefficient method can measure, is no less than $d_{max}/3$. When a latex glove with a maximum thickness of 100 µm is chosen as the insertion membrane, the maximum frequency $f_{max}$ will be 7.875 MHZ.

The ultrasonic receiver surrounding the insertion membrane is eliminated in the maximum reflection coefficient method. The inner ultrasonic transducer acts as the alternative ultrasonic receiver. An electronic switch controls the dual functional ultrasonic transducer. When the switch points to the power source (the sweeping frequency source and the power amplifier), the transducer transmits an acoustic wave toward the insertion membrane When the switch points to the receiving side (the pre-amplifier the power/area converter and the monitor), the transducer receives the reflected acoustic wave from the insertion membrane.

The power of the reflected acoustic plane wave W at the acoustic transducer, is the product of the area of the insertion membrane A, and the reflected acoustic intensity I. Thus the power of the reflected acoustic wave W, received by the ultrasonic transducer at the frequency f of $R_{max}$, can be converted into the relative area of the insertion membrane A, with the correspondent thickness d, using Eq. 4.

REFERENCES

[1] Kinsler LE, Frey AR, Coppens AB, Sanders JV [1982]. Fundamentals of acoustics. 3rd ed. New York, NY: W.J., p. 126–131.

[2] American Society for Testing and Materials [1990]. Standard specification for rubber surgical gloves. In: ASTM standards on protective clothing. Philadelphia, Pa.: American Society for Testing and Materials, pp. 133–135.

[3] American Society for Testing and Materials [1990]. Standard specification for rubber examination gloves In: ASTM standards on protective clothing. Philadelphia, Pa.: American Society for Testing and Materials, pp.136–138.

[4] Method 2011: Thickness, micrometer, flat foot [1955]. Fed. test method std. No. 601.

[5] Method 2021: Thickness, micrometer, spherical foot [1955]. Fed. test method std. No. 601.

[6] Method 2031: Thickness, optical [1955]. Fed. test method std. No. 601.

[7] Kuri-Yakub BT, Seraswat K {1993]. Thin film process monitoring techniques using acoustic waves. U.S. Pat. No. 5,271,274.

[8] Paap HJ [1985]. Acoustic method and apparatus for measuring thickness of a coating layer on a substrate. U.S. Pat. No. 4,539,847.

[9] Yu CC [1993]. Acoustical method and system for detecting and controlling chemical-mechanical polishing (CMP) depths into layers of conductors, semiconductors, and dielectric materials. U.S. Pat. No. 5,222,329.

What is claimed is:

1. A test method for measuring thickness, d, and correspondent area, A, of an insertion barrier membrane, said method comprising:

(a) applying an acoustic plane pressure wave with a sweeping acoustic frequency in an acoustic medium across said insertion membrane having a phase speed C and whose acoustic impedance is different from that of the acoustic medium;

(b) measuring transmission acoustic power, W, acoustic frequency, f, and reflected acoustic intensity, I, when acoustic intensity transmission coefficient reaches its peak, $T_{max}$;

(c) converting the measured frequency, f, into the thickness, d, using relationship $$d = \frac{C}{2f(T_{max})}; \text{ and}$$

(d) converting the measured transmission acoustic power, W, into the correspondent area, A, using relationship $$A = \frac{W}{I}.$$

2. A test method for measuring thickness, d, and correspondent area, A, of a barrier membrane, said method comprising;
 (a) applying an acoustic plane pressure wave with a sweeping acoustic frequency in an acoustic medium toward said barrier membrane having a phase speed, C, and whose acoustic impedance is different from that of the acoustic medium;
 (b) measuring reflection acoustic power, W, acoustic frequency, f, and reflected acoustic intensity, I, when acoustic intensity reflection coefficient reaches its peak, $R_{max}$;
 (c) converting the measured frequency, f, into the thickness, d, using relationship $$d = \frac{C}{4f(R_{max})}; \text{ and}$$

(d) converting the measured acoustic power, W, into the correspondent area, A, using relationship $$A = \frac{W}{I}.$$

3. System for measuring thickness and correspondent area of an insertion barrier membrane, said system comprising:
 a sweep frequency source, a power amplifier, an acoustic transducer, an acoustic receiver, a pre-amplifier, a peak transmission detector, a frequency-of-peak-transmission detector, a frequency/thickness converter, a power/area converter, and a monitor;
 wherein said sweep frequency source includes means for providing sweeping frequency up to an upper frequency limit to said power amplifier and said frequency-of-peak-transmission detector;
 wherein said power amplifier includes means for amplifying the sweeping frequency signal from said sweep frequency source to provide enough electrical power to drive said acoustic transducer;
 wherein said acoustic transducer includes means for converting electrical sweep frequency signal into acoustic sweep frequency wave which is transmitted toward said insertion membrane;
 wherein said acoustic receiver includes means for converting the transmitted acoustic wave across said insertion membrane into electrical signal which contains information on acoustic intensity transmission coefficient and for acoustic transmission power;
 wherein said pre-amplifier includes means for pre-amplifying the electrical signal from said acoustical receiver to an acceptable level so that the signal can be detected by the peak transmission detector;
 wherein said peak transmission detector includes means for detecting acoustic-peak-transmission coefficient and/or acoustic-peak-transmission power, which are contained in the electrical signal from said pre-amplifier, means for sending a synchronization signal to said frequency-of-peak-transmission detector when the acoustic-peak-transmission coefficient and/or acoustic-peak-transmission power is detected, and means for sending the signal containing acoustic-peak-transmission power to said power/area converter;
 wherein said frequency-of-peak-transmission detector includes means for recording the frequency when it receives the synchronization signal from said peak transmission detector, and means for sending this recorded frequency to said frequency/thickness converter;
 wherein said frequency/thickness converter includes means for converting the acoustic frequency of peak transmission into the thickness;
 wherein said power/area converter includes means for converting the electrical signal, which contains the information on acoustic-peak-transmission power through said insertion membrane, into the area of said insertion membrane; and
 wherein said monitor includes means for displaying, storing, and outputting a thickness distribution, of the thicknesses and the correspondent area of said insertion membrane.

4. System for measuring thickness and correspondent area of a barrier membrane, said system comprising:
 a sweep frequency source, a power amplifier, a reciprocal acoustic transducer, an electronic switch, a pre-amplifier, a peak reflection detector, a frequency-of-peak-reflection detector, a frequency/thickness converter, a power/area converter, and a monitor;
 wherein said sweep frequency source includes means for providing sweeping frequency up to an upper frequency limit to said power amplifier and said frequency-of-peak-reflection detector;
 wherein said power amplifier includes means for amplifying the sweeping frequency signal from said sweep frequency source to provide enough electrical power to drive said reciprocal acoustic transducer;
 wherein said reciprocal acoustic transducer includes a transmitting function mode for converting the electrical sweep frequency signal into acoustic sweep frequency wave which is transmitted toward said membrane; and a receiving function mode for converting the reflected acoustic wave from said membrane into an electrical signal which contains information on acoustic-intensity-reflection coefficient and/or acoustic reflection power;
 wherein said electronic switch includes means for automatically switching said reciprocal acoustic transducer between said transmitting function mode and said receiving function mode;
 wherein said pre-amplifier includes means for pre-amplifying the electrical signal from said reciprocal acoustic transducer in receiving function mode to an acceptable level so that the signal can be detected by the peak reflection detector;
 wherein said peak reflection detector includes means for detecting acoustic-peak-reflection coefficient and/or acoustic-peak-reflection power, which are contained in the electrical signal from said pre-amplifier, means for sending a synchronization signal to said frequency-of-peak-reflection detector when acoustic peak reflection power is detected, and means for sending the signal containing acoustic-peak-reflection power to said power/area converter;
 wherein said frequency-of-peak-reflection detector includes means for recording the frequency when it receives the synchronization signal from said peak reflection, and means for sending this recorded frequency to said frequency/thickness converter;

wherein said frequency/thickness converter includes means for converting the acoustic frequency of peak reflection into the thickness;

wherein said power/area converter includes means for converting the electrical signal, which contains the information on acoustic-peak-reflection power from said membrane, into the area of said membrane; and wherein said monitor includes means for displaying, storing, and outputting a thickness distribution, which is the observed thicknesses and the correspondent area of said membrane.

5. The test method as defined in claim 1, wherein the acoustic medium is air.

6. The test method as defined in claim 2, wherein the acoustic medium is air.

* * * * *